United States Patent
Bunch

(10) Patent No.: US 6,198,722 B1
(45) Date of Patent: Mar. 6, 2001

(54) FLOW CONTROL METHOD FOR NETWORKS

(75) Inventor: William Bunch, Sunnyvale, CA (US)

(73) Assignee: National Semiconductor Corp., Santa Clara, CA (US)

( * ) Notice: Subject to any disclaimer, the term of this patent is extended or adjusted under 35 U.S.C. 154(b) by 0 days.

(21) Appl. No.: 09/031,850

(22) Filed: Feb. 27, 1998

(51) Int. Cl.[7] .................................................. H04L 12/413
(52) U.S. Cl. ........................... 370/229; 370/230; 370/448
(58) Field of Search ..................................... 370/230, 231, 370/232, 253, 235, 236, 237, 238, 229, 226, 242, 243, 448, 447

(56) References Cited

U.S. PATENT DOCUMENTS

| | | | |
|---|---|---|---|
| 4,799,215 | * 1/1989 | Suzuki ................................. | 370/227 |
| 5,351,241 | 9/1994 | Yehonatan ........................... | 370/85.3 |
| 5,422,887 | 6/1995 | Diepstraten et al. ................ | 257/233 |
| 5,784,375 | * 7/1998 | Kalkunte et al. .................... | 370/448 |
| 5,838,688 | * 11/1998 | Kadambi et al. .................... | 370/445 |
| 5,905,870 | * 5/1999 | Mangin et al. ...................... | 709/234 |
| 6,055,578 | * 4/2000 | Williams et al. .................... | 709/253 |

* cited by examiner

*Primary Examiner*—Wellington Chin
*Assistant Examiner*—Brenda H. Pham
(74) *Attorney, Agent, or Firm*—Limbach & Limbach LLP

(57) ABSTRACT

A method is shown for a central node to flow control one or more end stations operating under a medium access control protocol wherein the central node transmits a signal to the end stations that causes the end stations to defer a data transmission, and wherein the central node halts the transmission to reset a protocol timer in the end stations, and wherein the central node resumes transmission before expiration of another protocol timer that would cause the end stations to commit to attempting a data transmission onto the communications medium and the end stations can thereby be held in a flow control state without loss of transmission packets. A central node device is shown for a network with a port configured to couple to a communications medium in communication with an end station, wherein the end station is configured to control its access to the medium according to a predetermined communication protocol that requires that the end station refrain from transmitting data onto the communications medium for a first period of time when the end station detects transmission activity on the medium and also requires that the end station wait for a gap in transmission activity that is at least as great in duration as a second period of time before committing to transmit data and that the end station continue to refrain from transmitting for the first period of time if the end station detects a resumption of transmission activity before the end of the second period of time.

22 Claims, 10 Drawing Sheets

FLOW CONTROL METHOD FOR NETWORKS

BACKGROUND OF THE INVENTION

1. Field of the Invention

The present invention relates to a method and apparatus for optimizing flow control of message traffic on a local area network (LAN). More particularly the present invention relates to a flow control method and apparatus that can be added to existing networks without disruptively interfering with existing network protocols or operations.

2. Description of the Related Art

A local area network, or LAN, is a system that provides interconnection and a communication protocol between a number of independent computing stations within a proximate area, such as a single building or a campus of adjacent buildings. An overview of local area network concepts and technology is set forth in William Stallings' book entitled *Local Networks*, Third Edition, MacMillan Publishing Company, 1990, and is hereby incorporated herein by reference.

Networks are typically constructed from network condensers such as routers, switches, bridges, repeater units, and hubs. End users that connect to the network, e.g., a desktop computer, provide a network node. Nodes are typically workstations, servers, printers, etc., and condensers concentrate the nodes into a common network. Routers and switches/bridges, intelligently or blindly, direct network traffic. At the most basic level, network condensers are devices that interconnect network nodes attached to a structured wiring plant. Network condensers are most often employed to concentrate, amplify, and restructure incoming signals; they allow the different nodes to communicate with one another by repeating signals they receive to some or all of the nodes attached to them, which is the basic function common to all the network repeater units mentioned above.

For simplicity, the term repeater unit will usually be used throughout the remainder of this specification to refer to network condensers performing the basic function of retransmitting a data packet received from a node though with the understanding that some types of network condensers perform more complex processing of network node transmissions.

Data is communicated over the network in units that are usually referred to as "frames" or "packets." In addition to data to be transmitted, each packet includes protocol control information such as the address of the packet source (transmit station) and the address of the packet destination (receive station).

As indicated above, there are several accepted terms that describe different kinds of network condensers in terms of their processing of network node transmissions. For example, routers, switches, bridges, repeater units and hubs are all physical units that are used to interconnect nodes on a LAN or to interconnect LANs themselves. A repeater is the simplest type of interconnect device since a repeater merely replicates incoming packets on its remaining ports. Switches or bridges buffer data packets that they receive and look at the address field of each data packet to make a routing decision, sending packets only out of selected ports. Routers look at both the address and the protocol header of each packet to determine the routing for each packet. All of these condenser devices typically include several ports, sometimes numbering in the hundreds. The ports provide the physical means to build a network; specifically, the ports are most often used to provide network connection points for the nodes. However, as indicated above, a port can also be used to connect one network condenser to another.

The interconnection pattern or layout of a network is called a topology. One such well known topology has a star configuration. In a star topology network, each node has a dedicated communication medium connected to a port on the repeater unit, e.g. each node has its own cable connection to the repeater unit. A packet transmitted by the node propagates through the medium and is received by the repeater unit which recovers the data contained in the packet and retransmits it to the destination station to which it is addressed. Similarly, the repeater unit transmits packets which propagate through the medium and are received an attached node or another repeater unit.

LANs utilize one of two types of data transmission techniques: either baseband or broadband. Baseband transmission uses signaling which can encompass the entire frequency range of the transmission medium and can be implemented with all media types but is typically implemented with twisted pair, coaxial, or fiber optic cable. Broadband transmission uses signaling where the signal is encoded within a limited frequency range. The signal used to modulate a broadband signal to a specific frequency range is referred to as a "carrier." By restricting the frequency range, broadband systems can multiplex many independent communication channels onto a single medium.

In a baseband LAN, digital data is converted to signals typically using Nonreturn-to-zero (NRZ) encoding. The signals are transmitted onto the medium encoded as voltage pulses typically using the well known Manchester encoding method. Transmission is bi-directional; that is, a signal inserted at any point on the medium propagates in both directions to the ends of the medium where it is absorbed. Baseband systems can extend only a limited distance, usually about a 1.0 KM maximum for copper based media without regeneration, due to attenuation of the signal. Fiber optic baseband systems are cable of distances of approximately 40 KM.

Because of the wide variety of physical, electrical, optical and procedural characteristics available to designers of equipment for local area networks, it has become widely acknowledged that certain standards must be observed. For example, the International Organization for Standardization (ISO) has developed a voluntary Open Systems Interconnection (OSI) model which defines a general computer networking system architecture. In principle, an "open" system may be designed in a unique manner but still be able to communicate with other open systems, provided that the implementation conforms to a minimal set of OSI standards. The OSI model is general and applies to both wide area networks and LANs.

The problem of complexity in computer network communication is best handled by using a layered architecture approach, in which all networking functions are partitioned into several groups, called layers, in such a way that upper layers use services provided (or functions performed) by lower layers. The OSI model implements the layered architecture concept and defines a number of layers, the particular functions performed by each layer, and interlayer interfaces. The partitioning of all networking functions into layers is guided by two contradictory constraints. When more layers are used, each becomes smaller and simpler. On the other hand, the use of many layers creates many interlayer interfaces, and the processing overhead necessary to handle additional interfaces eventually offsets the benefits gained by layer simplification.

The OSI model partitions networking functions into seven layers, as shown in FIG. 1. These layers include the Physical (or medium) layer 1, the Data-link layer 2, the Network layer 3, the Transport layer 4, the Session layer 5, the Presentation layer 6, and the Application layer 7. As noted above, the OSI model also defines the interlayer interfaces. A message to be sent from a program running on a first computer to a program running on a second computer must be passed from the application layer 7 of the first computer all the way down to the physical layer 1 of the first computer, across the network medium, and up from the physical layer 1 of the second computer, all the way up to the application layer 7 of the second computer. Thus, under the OSI model networked computers must implement the seven layer "protocol stack" in order to allow applications to communicate.

Once the OSI model was adopted, more refined standards defining each of the OSI layers could be developed. For example, if a standard is established for the data-link layer 2, specifying its functions and upward and downward interfaces, any product that implements the standard in any way is compatible with other products that obey the same standard. Several standardization organizations developed implementation standards for different OSI layers.

A number of local area network protocol standards that implement one or more layers of the OSI model have been developed by the Institute of Electrical and Electronics Engineers (IEEE) 802 committee. One of the best known standards published by the IEEE 802 committee, the IEEE 802.3 standard, is based on the Ethernet local area network developed by Xerox Corporation in the mid-1970s. This standard, available from the IEEE, is hereby incorporated herein by reference. The Ethernet architecture was used as the basis for defining a protocol for bus or tree topology LANs that is also frequently utilized with star topology LANs that anticipate that stations on the network will be located a relatively short distance (no more than 100 meters) from the repeater unit. Within the IEEE 802.3 10BASE-T standard, a repeater unit is a device which allows the star topology network to mimic the logical operation of its bus topology counterpart.

As discussed below, the IEEE 802.3 standard defines a protocol that implements the carrier sense multiple access with a collision detection (CSMA/CD) method for bus contention. The standard also defines an implementation of an ISO compliant medium access control (MAC) function for transmitting packets to and receiving packets from the transmission medium (Physical layer 1) as well as the packet structure and the interaction that takes place between other entities that implement the MAC function on the network.

Since different media types may be used by the same underlying MAC, the standard provides a common interface called the Attachment Unit Interface (AUI). Different media access units (MAUs) that implement the required functions for interfacing to a given media type may be connected to the AUI. Examples include: 10BASE-2 MAUs which connect a MAC or a repeater unit to coaxial cable; and 10BASE-T MAUs which connect a MAC to two copper twisted pair cables. The MAC and its associated AUI are collectively referred to as an end station, node or sourcing station. The AUI governs 10 Mb/s systems. A similar interface definition called the Media Independent Interface provides similar capabilities to both 100 Mb/s and 10 Mb/s systems.

As stated above, in a star topology network, a transmission from a node on the network is first transmitted to the repeater unit which either retransmits the packet through all of the repeater unit's ports so that it is received by all other end stations or the repeater unit performs some routing and directs the packet to ports corresponding to the contents of the packet. A conventional repeater is transparent to the rest of the network system. It does no buffering or routing and does not isolate one segment from the rest of the network. Thus, if two stations on different segments attempt transmission at the same time, their transmissions will collide.

FIG. 2 depicts an example of an Ethernet 802.3 network with a point-to-point star topology. Multiport repeater 100 is shown terminating three nodes 20, 30, 40 each with its own network communication segment (22, 32, 42 respectively). Each network segment 22, 32, 42 terminates one of the repeater interfaces 120, 130, 140 on repeater 100. The network communication segments 22, 32, 42 together constitute the network medium 22, 32, 42 in FIG. 2.

Though the IEEE 802.3 CSMA/CD protocol defines a "random access" or "contention" technique for multiple stations sharing a network medium where any station is allowed to transmit without permission from any other network device, it also is used to address the problem of how both the end station and repeater unit will share a common transmission medium when the end station and repeater unit contend with one another to transmit on the shared medium.

According to the well-known carrier sense multiple access (CSMA) technique, a station 20, 30, 40 wishing to transmit first "listens" to the medium 22, 32, 42 to determine if another transmission is occurring. If the station 20, 30, 40 determines that the medium 22, 32, 42 is in use, then the station 20, 30, 40 idles for some pseudo-random time and then re-attempts the transmission. The pseudo-random time is a calculated value determined by a "backoff algorithm". If the medium 22, 32, 42 is idle, then the station 20, 30, 40 transmits. If two or more stations 20, 30, 40 (or the repeater 100) transmit at the same time, then a collision occurs. To account for collisions, the transmitting station (20 for example) waits a period of time after transmitting for an acknowledgment that its transmission has been received by the destination station (30 for example). If no acknowledgement is received, then the transmitting station 20 assumes that a collision has occurred and retransmits.

Although the CSMA technique is an efficient method for managing transmission on a shared medium, it does have deficiencies. For example, when two packets collide, the medium 22, 32, 42 remains unstable for the duration of transmission of both packets. For long packets, the amount of transmission bandwidth wasted before retransmission is permitted can be considerable.

This bandwidth waste can be reduced if a transmitting station 20 continues to listen to the medium 22, 32, 42 while it is transmitting. The protocol for this more sophisticated procedure, known as carrier sense multiple access with collision detection (CSMA/CD) are as follows. If a station 20 for example, wishing to transmit senses that the medium 22, 32, 42 is idle, it then transmits. If the station 20 senses that the medium 22, 32, 42 is busy, it continues to listen to the medium 22, 32, 42 until it senses that the medium 22, 32, 42 is idle and then transmits. If the station 20 detects a collision (two simultaneous transmissions) during transmission, then it transmits a brief jamming (JAM) signal to assure that all stations on the network know that there has been a collision; then it ceases transmission. After transmitting the jamming signal, the station waits a pseudo-random period of time computed using the backoff algorithm and then re-attempts the transmission.

One important dimension of a star topology network is determined by the number of repeaters between end stations and the number of network medium "segments" 22, 32, 42 terminating on the repeater 100 wherein a segment 22, 32, 42 connects the repeater 100 to a single end station or node 20, 30, 40. A repeater unit may include two or more MAUs and associated logic joined together and connected to two or more different segments of the network medium.

FIG. 3 is a more detailed diagram of the connection between a repeater 100 and a node 20. Network segment 22 is the bidirectional communication medium between MAU 26 of node 20 and repeater interface 120 of multiport repeater 100. MAU 26 decodes signals received on segment 22 into digital input data Din for digital terminating equipment (DTE) 28. Some typical examples of common DTE devices are personal computers and printers. MAU 26 also encodes digital output data Dout from DTE 28 and transmits it onto segment 22. DTE 28 also receives control information CONTROL from MAU 28. Examples of signals that may comprise control information CONTROL are carrier received, clear to send data, not clear to send data, and collision detect.

FIG. 4 illustrates a detailed example of an IEEE 802.3 multi-port repeater system 100. Each repeater interface 120, 130 and 140 consists of a transceiver and a port, such as transceiver 122 and port 124 of repeater interface 120. A Manchester encoded data packet received at one of multiple transceivers (XCVR) such as XCVR 122 of the system 100 is processed by the associated port logic 124 and then provided via a multiplexor 110 to a decoder 150. The decoder 150 recovers NRZ encoded data and a clock signal from the Manchester encoded input. Data is placed on a CONTROL BUS for processing by a central state machine 160, which implements the repeater's protocol facilities, aided by a set of central counters 170. Information generated by the central state machine 160 may be provided to a set of display devices and drivers 180. Data recovered from the decoder 150 is entered, via a RX DATA PATH BUS, into an elasticity first-in-first-out (FIFO) buffer 190. From the FIFO buffer 190, the data is read, Manchester encoded, and then retransmitted to all the other network segments terminating on the repeater, such as the segments connected to the other repeater interfaces 130, 140.

The IEEE 802.3 standard provides for a variety of medium and data-rate options within the protocol. To distinguish implementations using different alternatives, the following notation was originally used:

(data rate in Mbps)|(medium type)–(max. segment length/100M)

Thus, an IEEE 802.3 network with a data rate of 10-Mbps, a baseband medium and a maximum segment length of 500 meters is referred to as a 10BASE-5 network. Unfortunately, there are many exceptions to this notation such as 10Base-T.

The IEEE 802.3 10BASE-5 standard specifies use of a 50-ohm coaxial cable of a defined thickness as the transmission medium and a data rate of 10 Mbps using digital signaling with Manchester encoding. It is these parameters in part that result in the maximum cable length being limited to 500 M/segment.

The IEEE 802.3 10BASE-2 standard provides a lower-cost network configuration well suited for personal computer networks and commonly referred to as "Cheapernet". As with a 10BASE-5 network, a 10BASE-2 network uses 50-ohm coaxial cable and Manchester encoding at a data rate of 10 Mbps.

The difference between a 10BASE-5 and a 10BASE-2 Cheapernet network is the use in a Cheapernet network of a thinner, more flexible cable which enables expanded, simpler installation options. However, the thinner cable suffers greater signal attenuation and lower noise resistance and, thus, only supports relatively shorter segment lengths.

The IEEE 802.3 network standard includes a "heartbeat" or "still active and connected" function. This is a signal sent from the MAU to the station that confirms that the MAU collision signal circuitry is working and connected to the DTE station. Without this signal, which is referred to as the signal-quality-error signal, the station is unsure whether the frame was actually sent without a collision or whether a defective MAU failed to properly report a collision. IEEE 802.3 also includes a "jabber" function. This is a self-interrupt capability that allows a MAU to inhibit transmitted data from reaching the medium if the transmission occurs for longer than a predetermined time period.

Chapter 9 of the IEEE 802.3 specification defines the standard for a repeater unit utilizable in 10 Mbps baseband networks. As stated in the specification, network segments may be connected directly by repeater unit combinations as long as only one signal path is operative between any two points on the network and the number of repeater units in that signal path is not greater than four. The 802.3 repeater unit must be designed to receive and decode data from any network segment under defined jitter conditions and to retransmit data to all other network segments attached to it with timing and amplitude restored. Retransmission of data occurs simultaneously with reception. If a collision occurs, the repeater unit propagates the collision event throughout the network by transmitting a JAM signal. The repeater unit also detects and isolates faulty network segments.

A fundamental behavior that controls whether an IEEE 802.3 end station may transmit or not transmit is called deferral. In other words, a station will not transmit during deferral. Deferral is controlled in the MAC by the use of a carrier received signal (CRS). CRS is asserted whenever carrier activity is received at the end station regardless of whether the carrier includes data or not.

The time between the transmission of frames is referred to as the interframe gap (IFG). The IEEE 802.3 standard defines that the IFG is ninety-six bit times long. That is, the period of time required to transmit ninety-six bits.

The 802.3 standard allows two different forms of deferral: two-part deferral and one-part deferral. In two-part deferral, Ethernet MACs will defer to a CRS that is activated less than sixty-four bit times after the last successful transmission or reception. This is true because the interframe gap of ninety-six bits is divided into a first portion (typically ⅔ of the total IFG or sixty-four bits) where any carrier activity will cause deferral to continue and a second portion (typically the final ⅓ of the IFG) where the station will transmit even though a carrier signal is present. The carrier signal does not result in valid data being passed to higher protocol layers above the MAC so long as the signal does not contain a Start of Frame Delimiter (SFD) bit pattern.

Before the advent of two-part deferral, the almost obsolete one-part deferral method was used exclusively. In one-part deferral, once a station has a frame to transmit, it waits for any frame currently on the medium to complete (CRS deasserted), waits its interframe gap, and then transmits onto the medium independent of the value of CRS when the interframe gap timer expires. Only the earliest Ethernet devices were designed to function in this manner and continue to exhibit this behavior. The vast majority of network equipment currently in use implement and thus exhibit two-part deferral behavior. One-part deferral is accommodated by the IEEE 802.3 standard in that it permits the first part of a two-part deferral to be any time duration including zero. However, as indicated, the vast majority of implementations that will be encountered in the marketplace use the well defined two-part deferral algorithm with the first part being ⅔ of the interframe gap.

A simple flow control system to control the transmission of a node may be designed to handle one-part deferral implementations. However, such a system will possess some undesirable side effects. One such side effect is that a collided end station's transmission is delayed, but the collision counter in the end station's MAC is incremented. As a result, a delay determined by the backoff algorithm will take place prior to another transmission attempt of the end station's data frame. In a poorly designed network or when severe congestion occurs elsewhere in the network, an end station may reach its attempt limit before the frame ever gets transmitted causing the frame to be discarded. However, while loss of a frame is extremely undesirable, it is not catastrophic. Ultimate responsibility for end to end packet delivery resides with the transport layer 4 above the MAC. Thus, because loss of a packet through excessive collisions is always a possibility in an Ethernet network, it must be accounted for at a higher layer in the protocol stack.

One-part deferral is, at its worst, the effective equivalent of a pure collision based flow control algorithm where a collision is caused whenever there is an unwanted transmission on the wire. A downside of this approach is that the star device will not know how long the collided station's MAC will take to schedule the next transmission since this time is pseudo-randomly determined by the backoff algorithm that depends upon the collision count of the collided end station. Therefore, a flow controlling agent that collides with an end station may have to wait for a substantial and undeterministic time period before the MAC transmits again.

SUMMARY OF THE INVENTION

The present invention provides for the flow control of data from end stations in a network that conform to a predetermined medium access control protocol. In accordance with an embodiment of the present invention, end stations are flow controlled by transmitting a signal from a repeater unit at the center of the star to a flow controlled end station and interrupting the transmitted signal at intervals based upon the medium access control protocol to prevent the end station from transmitting or discarding packets.

The present invention permits an end station to be deterministically flow controlled for indefinite periods of time without causing the end station to discard transmission data.

The present invention further permits data addressed to a flow controlled end station to be transmitted to the end station and used to maintain the end station in a flow controlled state.

The present invention still further permits end station transmission data to be buffered in the flow controlled end station rather than being stored within network equipment.

An embodiment of the present invention is a method for a central node to flow control an end station in a network wherein the central node transmits a first signal to the end station such that the first signal causes the end station to defer a data transmission, wherein the end station operates under a medium access control protocol, such as the MAC of IEEE 802.3, that requires the end station to detect transmission activity on a communication medium coupled to the end station before transmitting data on the communication medium. The MAC protocol requires that the end station wait for a gap in transmission activity on the communication medium that continues for at least a first time period defined by the protocol before attempting to transmit data. The central node halts transmission of the first signal such that a time duration of the transmission of the first signal is less than the first time period of the MAC protocol, wherein the MAC protocol requires the end station to wait for at least a second time period before committing to transmitting data onto the communications medium. The central node will resume transmission of the first signal such that the duration of the period of time during which transmission of the first signal is halted is less than the second time period of the medium access control protocol.

Another embodiment of the present invention is a central node for a network with a port configured to couple to a communications medium in communication with an end station, wherein the port is further configured to transmit signals onto the communication medium and receive signals from the communication medium, and wherein the end station is configured to control its access to the medium according to a predetermined communication protocol. The predetermined protocol requires that the end station refrain from transmitting data onto the communications medium for a first period of time when the end station detects transmission activity on the medium. The protocol also requires the end station to wait for a gap in transmission activity that is at least as great in duration as a second period of time before committing to transmit data, and to continue to refrain from transmitting for the first period of time if the end station detects a resumption of transmission activity before the end of the second period of time. The central node includes a flow control means, coupled to the port and configured to receive a flow control signal and a data signal, for controlling the transmission activity of the port, wherein the flow control means commands the port to transmit a first signal onto the communications medium when the flow control means receives the flow control signal, and wherein the flow control means will command the port to halt transmission of the first signal if the flow control signal remains active such that the duration of the transmission of the first signal is less than the first period of time, and wherein the flow control means will command the port to resume transmission of the first signal if the flow control signal remains active such that transmission of the first signal will be halted for a length of time that is less than the second period of time.

These and other features and advantages of the present invention will be understood upon consideration of the following detailed description of the invention and the accompanying drawings.

DETAILED DESCRIPTION OF THE INVENTION

The present invention is a half duplex flow control scheme for a star network using an IEEE 802.3 standard MAC that controls the transmission of packets from a particular MAC interface by manipulating the CRS signal received by the MAC.

The IEEE 802.3 MAC defers to passing frames even if the CRS events are longer than typical packets and smaller than the maximum allowed deferral called the "excessive deferral time." This means that an agent that sends a flow control message can prevent a MAC detecting the flow control message from transmitting for the period of an excessive deferral time (approximately 2 times a maximum size packet) without causing the MAC's collision counter to increment. This method of controlling flow is manageable from a system perspective.

More specifically, for a particular MAC, once the CRS event causing a deferral has started, it does not have to be stopped, thereby enabling the flow of data from the IEEE 802.3 MAC to be halted for an indefinite period of time. If the CRS event persists for longer than 24288 bit times (2 packets * 1518 bytes/packet * 8 bit-times/byte=24288 bit-times in an excessive deferral event), however, the IEEE 802.3 MAC will detect an excessive deferral event potentially causing it to discard its transmission packet and flag a network error. However, if CRS is deasserted, the excessive deferral timer for the MAC may be reset. As long as CRS is never asserted for more than an excessive deferral time and is deasserted and reasserted again within sixty-four bit times, the IEEE 802.3 MAC will hold its frame indefinitely without incrementing its collision count or possibly without even reporting an error condition. Some MACs may interpret an excessive deferral event based on the time the transmit has been pending and report a timeout to a management entity. Thus, a long deferral event will not cause improper network behavior, however it may be visible to a management entity on the network.

Further, since the CRS signal can be generated by a remote station, a remote device such as a repeater unit, switch, bridge, or router can control the MAC transmission characteristics of end stations with modified protocols that are completely backward compatible with the existing IEEE 802.3 infrastructure.

The present flow control mechanism permits the memory requirements of the network to be distributed among the end stations rather than a central network switch, provides a network switch with a mechanism to set an efficient operating point, can guarantee latency from one class of device to another, and can be used to implement a form of prioritization within the network.

Figure 1:
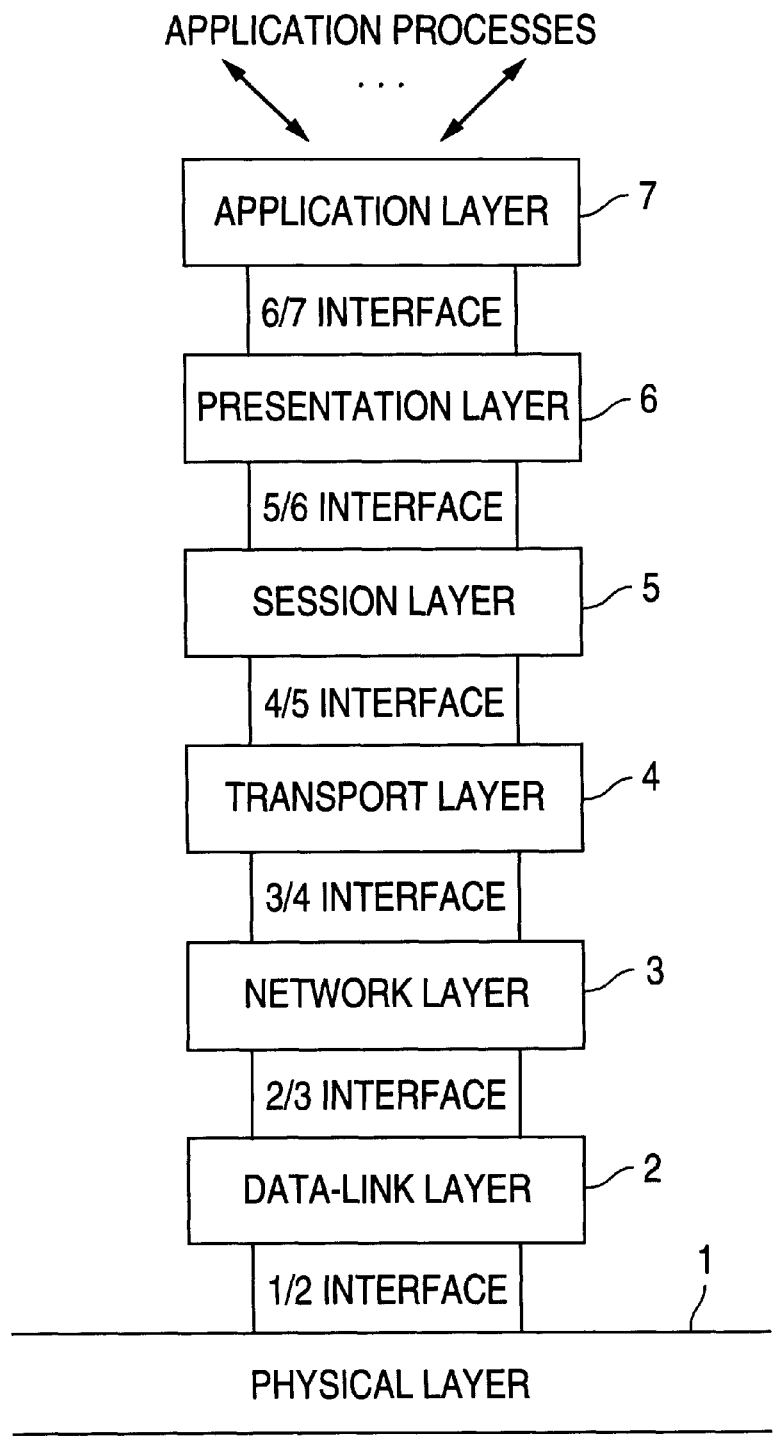
FIG. 1 is a block diagram depicting the structure of the International Organization for Standardization's Open Systems Interconnection model for networking.
Figure 2:
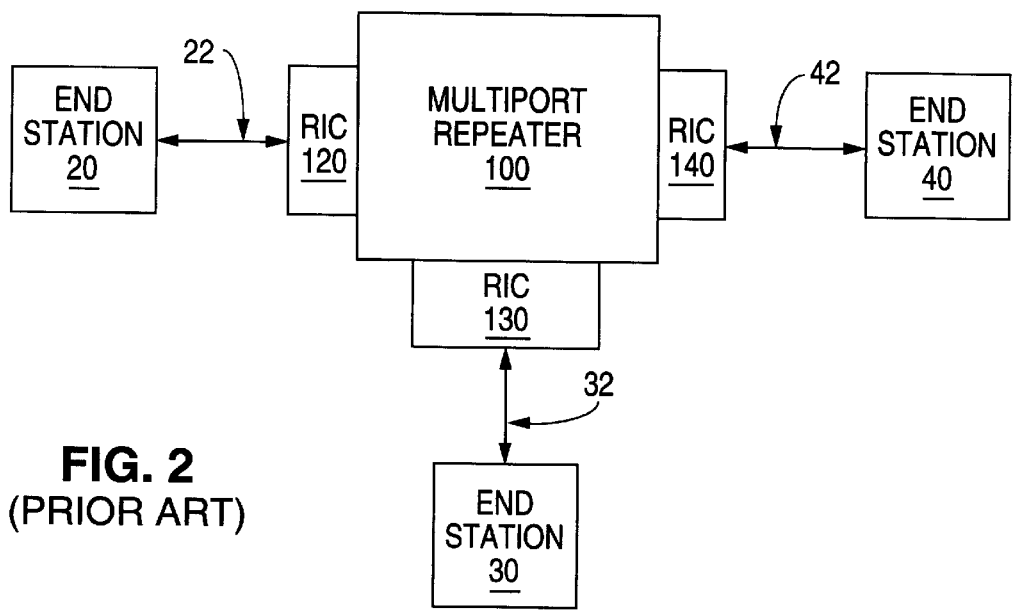
FIG. 2 is a functional block diagram showing a conventional star topology network with a single network repeater unit.
Figure 3:
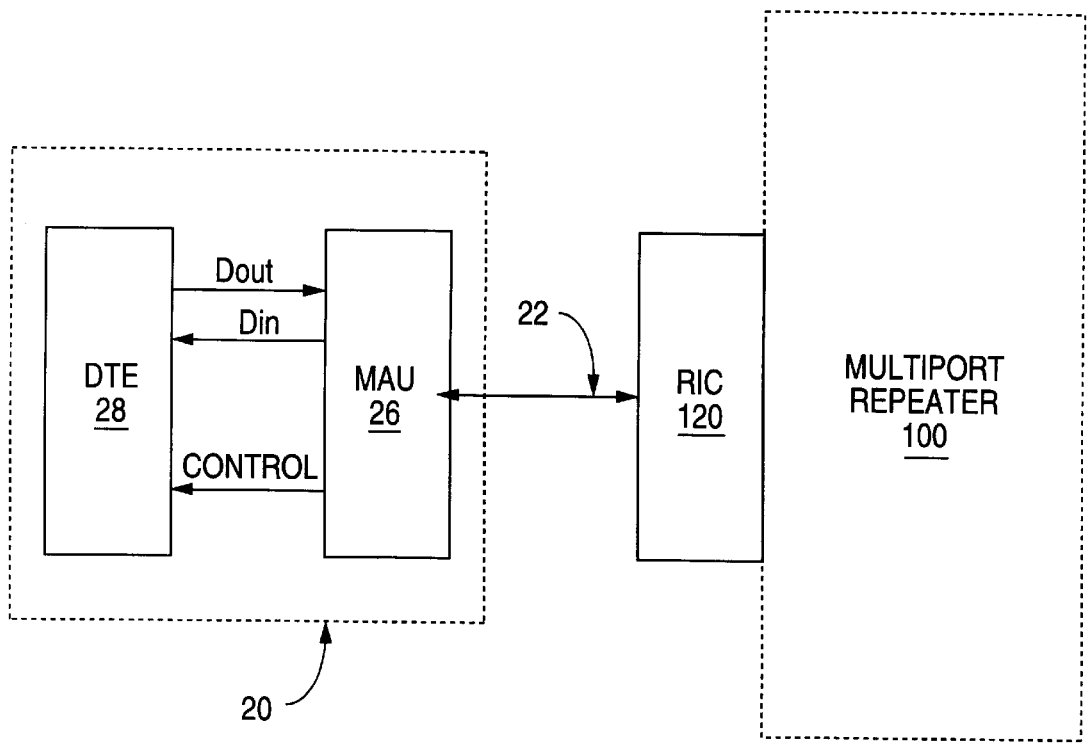
FIG. 3 is a functional block diagram of a conventional connection between a network repeater unit and a node.
Figure 4:
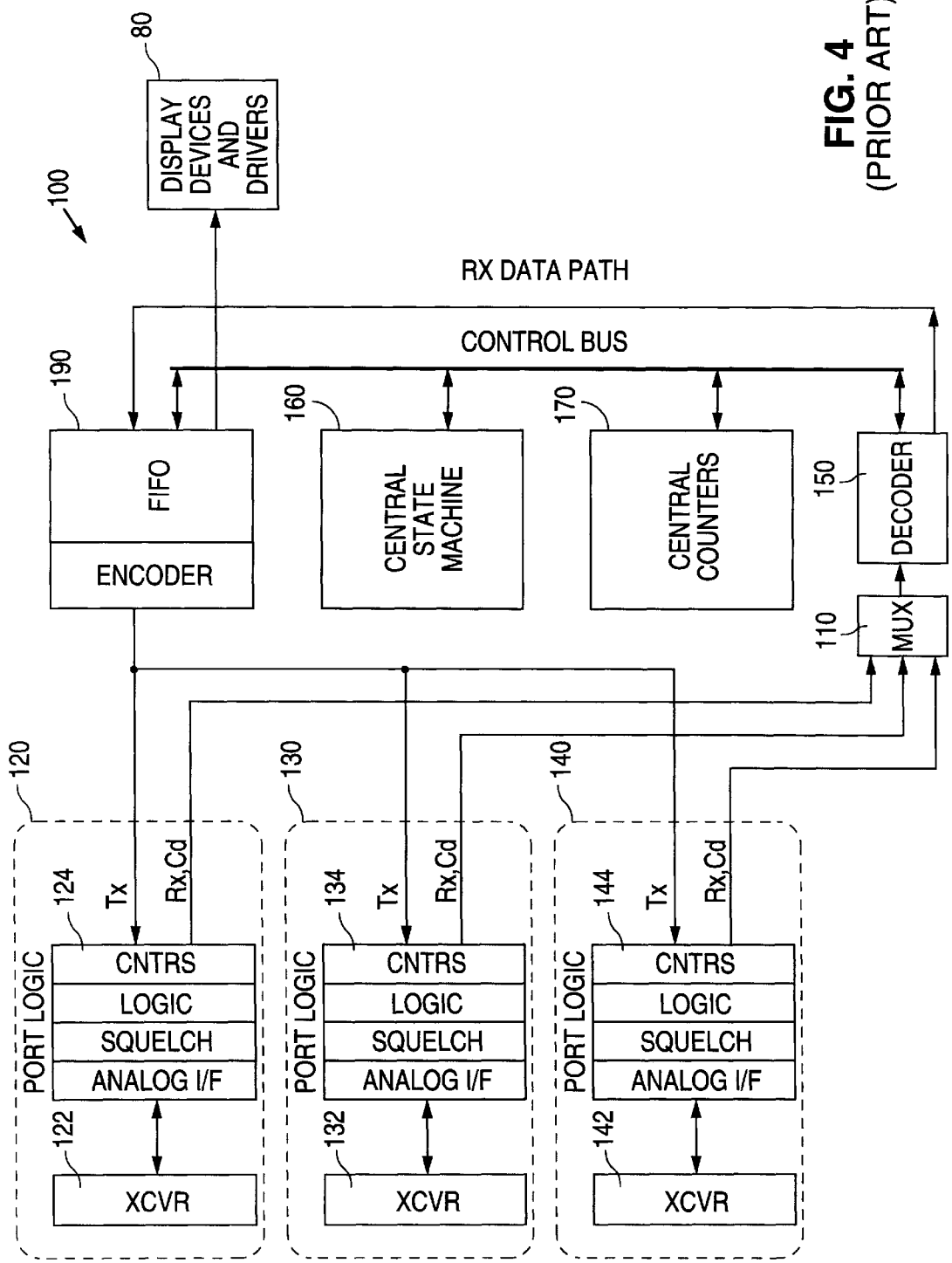
FIG. 4 is a functional block diagram of a conventional multi-port network repeater unit.
Figure 5:
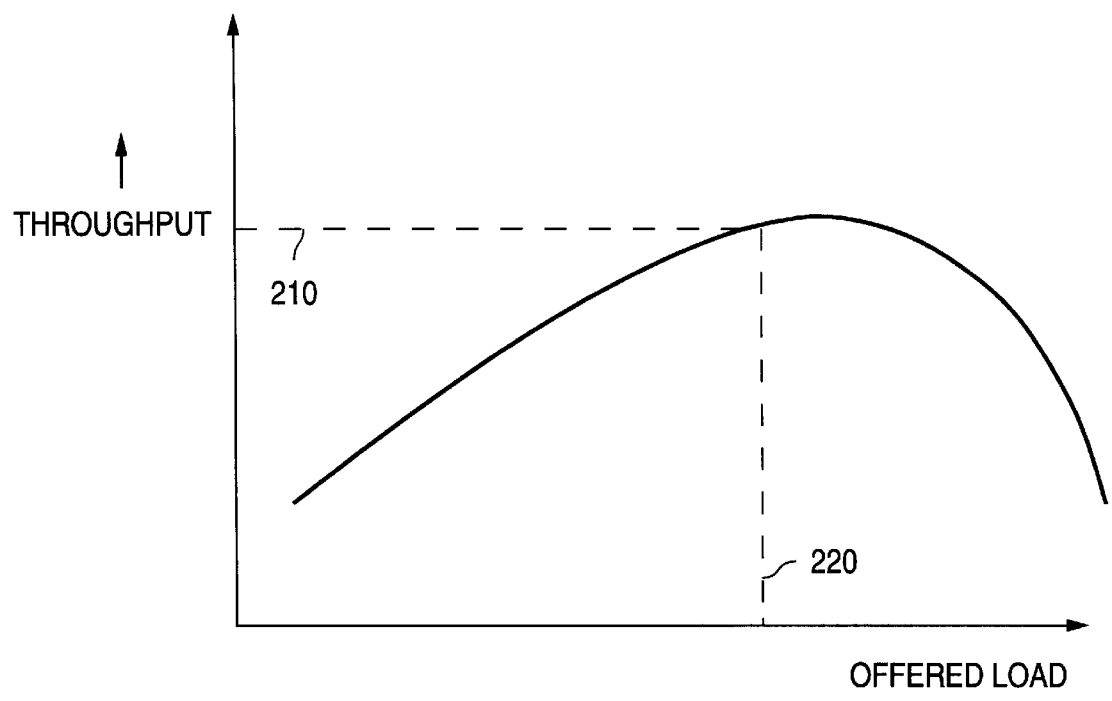
FIG. 5 is a graph of network message throughput as a function of the amount of network message load being offered to the network.

More specifically, the present invention provides a network switch with a mechanism to set an efficient operating point by allowing the repeater unit to control the offered load to the network. Since an IEEE 802.3 repeater unit and its attached network's performance is dependent on the load offered to the network, controlling the amount of traffic presented to the network allows it to be run more efficiently. That is, an Ethernet system becomes inefficient when enough traffic is presented to the network such that collisions and deferrals cause data loss and degradation of throughput. A typical Ethernet load versus throughput curve is depicted in FIG. 5.

By allowing the repeater unit to control the load offered to the network, the throughput can be optimized. In other words, using the flow control methods of the present invention, the offered load can be tailored to achieve a maximum system throughput. For example, in FIG. 5, the offered load 220 can be controlled to insure that the throughput does not decrease below 210. Higher ISO layer entities (e.g. management) may apply the same kind of criteria used in a switched network to determine when resources are scarce and, hence, when to invoke the sending of a flow control message as embodied in this invention. For example, the management entity could monitor the number of collisions on a segment, collision counts for a given packet (monitors frame loss at the transmitter), percent of carrier, percent of useful bandwidth (i.e. time spent in error free communication vs. theoretical data rate), or a combination of the above.

In addition, the present invention can guarantee latency from one class of device to another and can be used to implement a form of prioritization within the network. By providing the central device in the network with the ability to control the timing of end station transmissions, a policy can be defined which allows traffic from a particular station or a particular stream of traffic to be recognized above other transmissions. By allowing prioritization to a station, the repeater unit can guarantee that a packet sits in the transmit queue for a deterministic time and no longer. This is equivalent to guaranteeing latency between devices within the network. Some applications, such as packetized video and audio are very sensitive to large variations in latency. Allowing a bound to be placed on the latency or "jitter" in the network allows a repeater unit to support these types of applications in a cost effective manner.

The repeater unit may recognize a characteristic contained in the packet (e.g. destination address, source address, protocol identifier) to determine a priority level for a given set of traffic. Since each repeater unit has a finite set of resources, the flow control method allows the repeater unit to control the use of these resources. By applying the prioritization criteria on the traffic, the repeater unit can make an intelligent decision whether to use the resources for the high priority traffic or flow control the traffic that does not meet the defined criteria.

Since the repeater unit has the ability to receive a transmission, reject it and hold it in the end station's queue indefinitely, it also is able to look at the contents of the packet and apply a set of criteria to determine its importance. This type of behavior can be characterized as a form of network look-ahead.

However, since an end station has the ability to multiplex independent streams in a random fashion, applying flow control on an apparently low priority frame may block a high priority frame behind it. This phenomena is known as "head of line blocking" (HOL). Therefore, for legacy end stations that do not also support more than one priority, this application for flow control is generally more suitable to giving all the traffic from a given station a different priority in the network. That is, priority is implemented on the edge of the network by controlling the end stations directly rather than within the switch fabric itself (i.e. switch to switch traffic would not be prioritized). All traffic within the switched domain would be treated with equal priority while end stations could be allowed access to the switch fabric as a result of policies distributed to the switches. One way of accomplishing the distribution of policy is through network management implemented for example using the well known simple network management protocol (SNMP).

Note that the repeater unit determines priority implicitly and requires no explicit communication mechanism of priority information between the end station and repeater unit or between repeater units. Another way to look at this is as a modification to the fairness of access of different stations to the network. Remote management could alter the importance of a station as network demands change.

In Ethernet, the CSMA/CD mechanism itself attempts to provide fairness for all stations when measured over a large period of time by randomizing which transmitters are allowed to access the network. However, Ethernet can become unfair during short time intervals when the network is under high load under a well known condition called the Capture Effect where a station or set of stations get a statistically higher amount of transmission than other stations. The stations that benefit from the Capture Effect are also random and, therefore, the Capture Effect disappears over larger time periods. Also, the traffic pattern is more likely to change when measured over a large time interval. Where the fairness of the network in Ethernet is determined by random processes within Ethernet controllers acting in concert, applying flow control using the present invention based on 'priority' as defined by a management entity, gives control back to the network installation as to which node gets what measure of "fair" and on what time scale.

Figure 6:
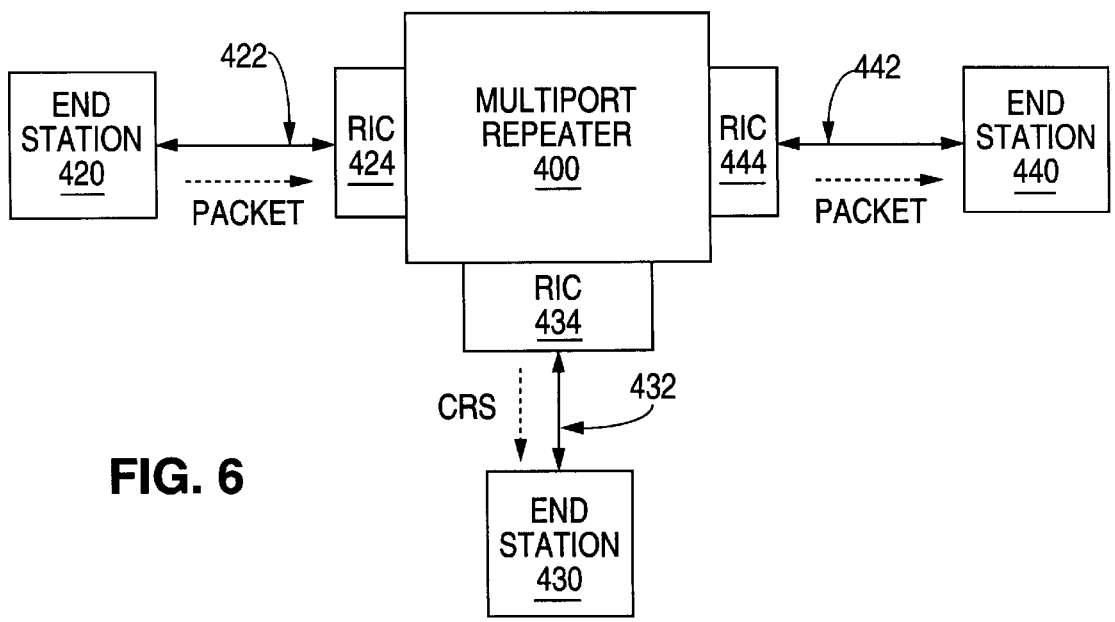
FIG. 6 is a functional block diagram of a star topology network with a network repeater unit embodying the present invention.

FIG. 6 shows a star topology network featuring multiport repeater 400 connected to end stations 420, 430 and 440 which function using the IEEE 802.3 MAC protocol which will be used to demonstrate the present flow control mechanism. As an example, consider the flow control of end station 430 while a conversation is in progress between end stations 420 and 440. Normally, if node 430 has data to send, it will wait until it sees no transmission on the medium and then begin to transmit. Node 430, however, may transmit during an interframe gap in the transmission of data from node 420 to node 440 and, once node 420 resumes transmission, a collision will occur causing both node 420 and node 430 to first transmit a JAM signal and then wait to see an interframe gap in transmission activity before attempting another transmission. The collision results in the loss of the transmission time for the collided frame plus the back off period.

By contrast, in the present flow control scheme, repeater 400 sends a CRS signal to end station 430 for a period of time no longer than 24288 bit times causing node 430 to defer transmission of its data. End station 430 may be deferred for longer than 24288 bit times if, before the passage of 24288 bit times, repeater 400 deasserts CRS for a period less than sixty-four bit times and then reasserts CRS. Flow control of node 430 will allow node 420 to complete the transmission of all the data packets of a data frame to node 440 without interruption or collision from node 430.

To release node 430 from flow control, repeater 400 halts transmission activity on communication medium 432 which deasserts the CRS signal at node 430. Node 430 will then wait for an Interframe Gap period of ninety-six bit times before transmitting its data. The ninety-six bit time wait by node 430 is advantageous for two reasons. First, ninety-six bit times is far less than the duration of the JAM signal and back off time that would result from node 430 transmitting and colliding with another node. Secondly, the behavior of node 430 can be deterministically controlled in that, if node 430 has data to transmit, it will definitely start transmission at the end of the Interframe Gap.

CRS can be generated in an end station by sending any signal that will be detected as network activity by the physical layer protocol of the end station. One approach is that only a carrier signal is generated. The requirement here is that if the signal activates the receiver, then the signal sent must result in the end station rejecting the packet.

For a 10BASE-T network, a signal that will generate CRS, but not cause the MAC to pass up data to the higher layers, is a repeating pattern of "1010" Manchester encoded and compatible with 10BASE-T physical layer transmissions. Basically, this is equivalent to the preamble of a normal data packet without a start of frame delimiter (SFD) or any of the other fields of an IEEE 802.3 frame. The preamble is used in 10BASE-T networks as a means for synchronizing the phase locked loop in the physical layer in order to extract a timing reference (clock) from the received signal and as an early indication of receive activity (CRS). Once the clock is recovered and the SFD is detected, the IEEE 802.3 MAC will pass the remaining fields in the IEEE 802.3 frame up to higher protocol layers. It is possible, for the flow control signal, to send only preamble with no SFD, so that no data is ever sent up from the MAC to the DTE. Instead, only CRS is generated as a result of the "extended preamble" and the CSMA/CD MAC behaves accordingly by deferring data transmission.

For other technologies including 100BASE-X and 100BASE-T4, it is sufficient to use a signal which corresponds to the correct encoding of the repeating "1010" pattern. As a logical illustration that it is in fact the case that in general the MACs for all these technologies must filter such events, note that normal operation can result in a repeater unit sending a fragment containing only "1010". For example, take the case where node 420 and node 430 are colliding through repeater 400. If the collision occurs in the preamble, the repeater 400 will have been repeating the first part of a good packet (which looks like preamble) and will switch to sending a JAM signal upon collision detection which also looks like preamble and is transmitted for a long enough period of time to ensure that the transmitted signal will reach the farthest reaches of the network so that all end stations in the network see the collision. The result is that node 440, which is not participating in the collision since it is not transmitting, sees a fragment that contains what appears to be only preamble. Since this is a perfectly valid, non-error condition that all MACs must be designed to deal with, the signaling technique of the present invention is valid for all base band network technologies independent of their encoding scheme.

Other encoding schemes have certain limitations as to how close CRS events may be (i.e. minimal time duration requirements for deassertion of CRS). For example, 100BASE-TX requires that 12 IDLE symbols be present between frames to maintain scrambler synchronization. This corresponds to forty-eight bit times. Forty-eight bit times would become the lower bound that a 100BASE-TX star device could separate CRS assertion signals. Sixty-four bit times is still the upper bound imposed by the MAC. For 100BASE-TX, there is a clear design window. For any MAC standard that imposes a lower bound greater than sixty-four bit times, the proposed signaling mechanism deteriorates into the conventional collision based flow control technique.

An additional advantage of the present flow control mechanism is that, if repeater 400 has data to send to the end station 430 being held in a flow control state, it may transmit this data to the end station in place of the preamble signal described above. Node 430 will not transmit so long as repeater 400 ensures that the end of the "defer signal" (CRS asserted) is less than sixty-four bit times from the start of the packet to be transmitted. Therefore, "deferring" can be continued by restarting transmission of the defer signal less than sixty-four bit times from the end of the packet. This represents an advancement for the flow control algorithm in that valid data may be passed to the end station being held in a flow control state by using a real packet as the transmission signal instead of just a preamble signal that causes CRS assertion but will not be passed up to the DTE by the MAC.

Another advantage of the present flow control mechanism is that transmission data is effectively buffered in the end stations by flow controlling the end stations. Because the repeater 400 is able to cause the end stations to hold their transmission data without discarding it, the repeater 400 is effectively using memory in the end stations to buffer the transmission data. Otherwise, in order to avoid losing packets, the repeater 400 would be forced to permit the end stations to transmit and the repeater 400 would have to store the transmitted data until the particular packet could be transmitted towards its destination. A network with many active nodes requires a large amount of memory to buffer the packets transmitted by the end stations and there is still no guarantee that, under high traffic conditions, the incoming data packets would not overflow the available repeater buffer memory resulting in lost packets. By flow controlling network activity at its source in the end stations, the memory requirements for buffering transmission data are distributed to the end stations where memory space has already been allocated for network communications and the end stations are inherently prevented from overflowing the buffering capacity of the network.

Figure 7:
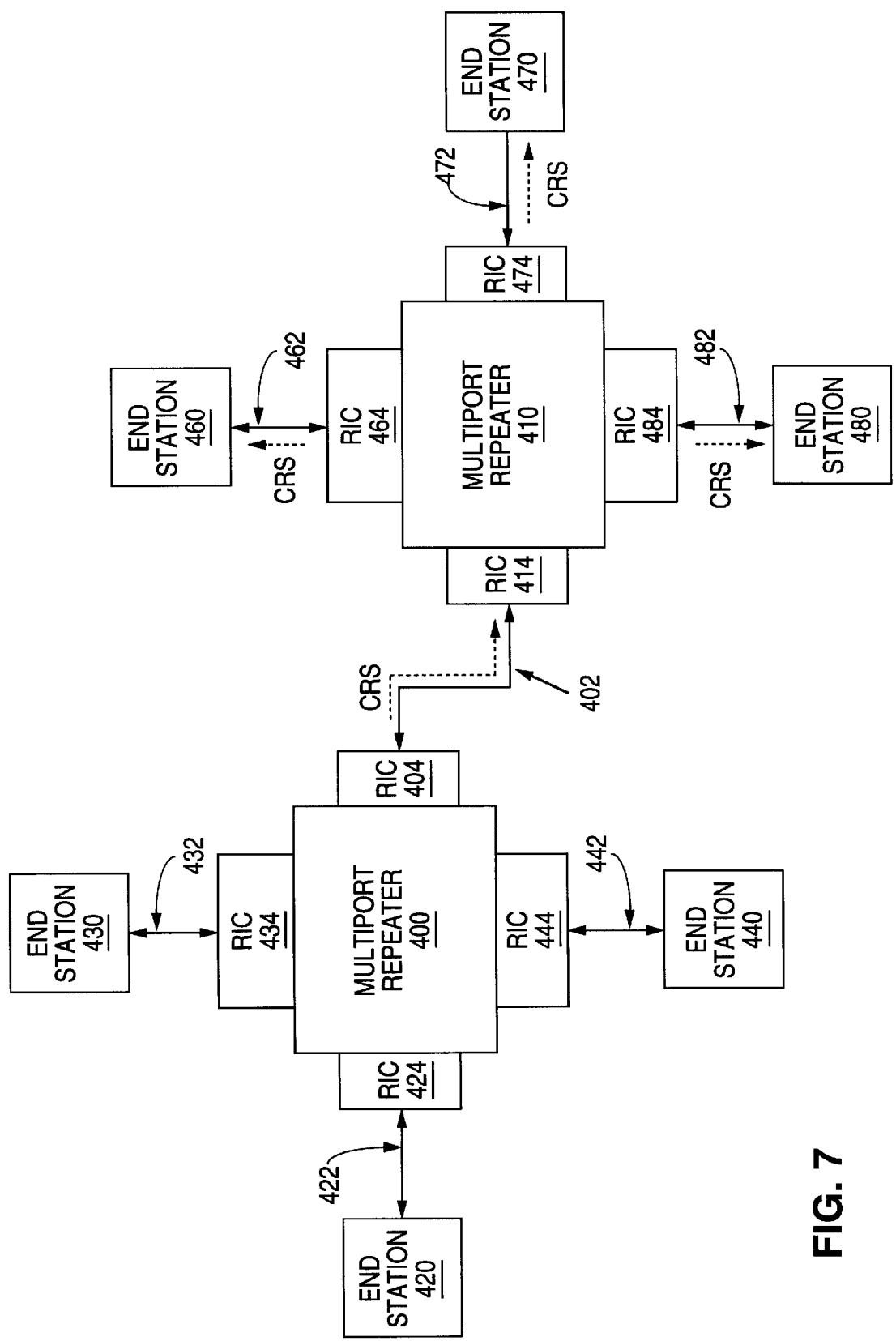
FIG. 7 is a functional block diagram of a star topology network with two network repeater units embodying the present invention.

As a demonstration of how the present flow control mechanism can control nodes in a network featuring multiple repeaters, FIG. 7 shows a network with two multiple port repeaters 400 and 410 which are connected to end stations 420, 430, 440, 460, 470 and 480 which function using the IEEE 802.3 MAC protocol. Each of multiport repeaters 400 and 410 of the present invention will transmit a CRS signal received from the other repeater to the end stations served by that repeater. For example, a CRS signal generated by repeater 400 will be received by repeater 410 and transmitted to end stations 460, 470 and 480. Conversely, a CRS signal generated by repeater 410 will be received by repeater 400 and retransmitted to end stations 420, 430 and 440. Thus, a flow control condition originating in repeater 400 can propagate through repeater 410 to prevent the other nodes in the network from transmitting.

The decision to flow control a particular node of the network may be made for a variety of reasons, such as when the repeater recognizes at the beginning of transmission that the transmitted packet is addressed to a node that is already busy, or when end station 420 is transmitting to end station 440 and end station 480 begins transmitting a packet addressed to end station 420. Another example is when the repeater unit senses or receives a signal indicating that there are insufficient resources in the system to accommodate the transmission. The decision to flow control is made at the level of system resource management which resides in a data communications controller in the repeater unit or elsewhere in the network.

Figure 8:
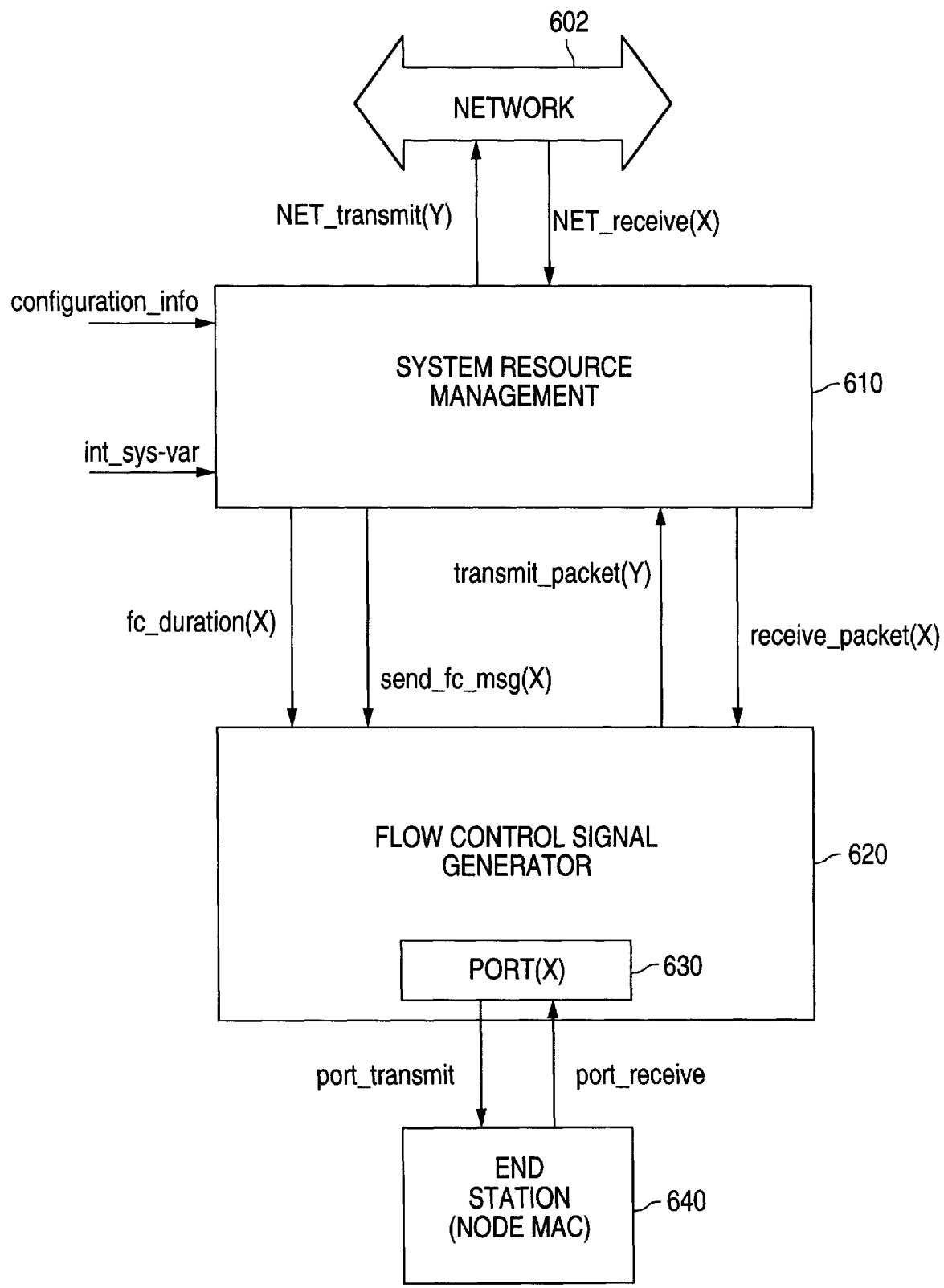
FIG. 8 is a functional block diagram illustrating the logical relationship between the network, system resource manager, flow control generator and port entities according to the present invention.

FIG. 8 is a block diagram illustrating an example of the logical relationship between the network, system resource management function, flow control generator function and port logic in the present invention. The system resource management (SRM) subsystem 610 is a logical entity responsible for collecting and maintaining information regarding the availability of system resources for the network 602. The SRM subsystem 610 determines whether it is necessary to issue a flow control message based upon such information as received message traffic (NET_receive(X)), transmitted message traffic (NET_transmit(Y)), the system configuration (configuration_info) and internally maintained system variables (int_sys_var). The variables X and Y in NET_receive(X) and NET_transmit(Y) refer to the address of a port corresponding to an end station to which the data in the NET_receive(X) or NET_transmit(Y) is addressed. A port is the logical system entity that services an end station. In the present example, Port(X) 630 is the port entity serving end station 640. Transmissions to and from an end station pass through the port corresponding to that end station.

Message traffic passes through SRM 610 and it passes down the receive_packet(X) destined for Port(X) 630 and relays transmit_packet(Y) sent from Port(X) 630 to the destination of Port(Y) located elsewhere in the network 602. Because SRM 610 monitors all message traffic on network 602, it knows which ports are already actively engaged. As a result, it can determine that the port to which a data packet is addressed is already busy and any port sending data to a busy port should be flow controlled.

When SRM 610 determines that Port(X) 630 should be flow controlled, it sends send_fc_msg(X) to the Flow Control Signal Generator (FCS) 620. An optional feature that may be included in the flow control system of the present invention is that, if the SRM 610 is able to calculate an expected duration of the flow control state for Port(X) 630, then SRM 610 also sends the flow control duration to FCS 610 as fc_duration(X).

Upon receiving send_fc_msg(X), FCS 620 will formulate the content of port_transmit for transmission by Port(X) 630 to end station 640. As discussed above, any transmission activity will serve to collide with an end station or cause the end station to defer transmission. The port_transmit signal can be a preamble signal which end station 640 will recognize as transmission activity but will not mistake for data. Alternatively, if FCS 620 receives a receive_packet(X) for Port(X) while Port(X) is in flow control, receive_packet(X) may be transmitted as port_transmit.

As an example, if a packet is being received on port 1 and the destination address within the header of the packet indicates that it is destined for port 2, but port 2 is already busy transmitting or receiving another packet, then port 1 should be flow controlled.

Once SRM 610 determines that port 1 should be flow controlled, it asserts the send_fc_msg(1) signal to FCS 620. FCS 620 will respond by transmitting preamble as port_transmit on port 1. Port_transmit will collide with the end station connected to port 1 causing it to terminate transmission of its packet to port 1. As discussed above, the end station will then monitor the transmission activity from port 1 and wait for another opportunity to transmit. FCS 620 will maintain the end station connected to port 1 in flow control by sending preamble on port 1.

If, however, SRM 610 receives a data packet NET_receive(1) for transmission on port 1, then it will send the data to FCS 620 as receive_packet(1). If there is sufficient time left in the duration of the flow control state for port 1, fc_duration(1), to permit transmission of the packet data on port 1, then port(1) will transmit receive_packet(1) on port_transmit to the end station. Transmission of receive_packet(1) will continue to maintain the end station in flow control and while the data transmission is results in valid received data packets at the end station.

Figure 9:
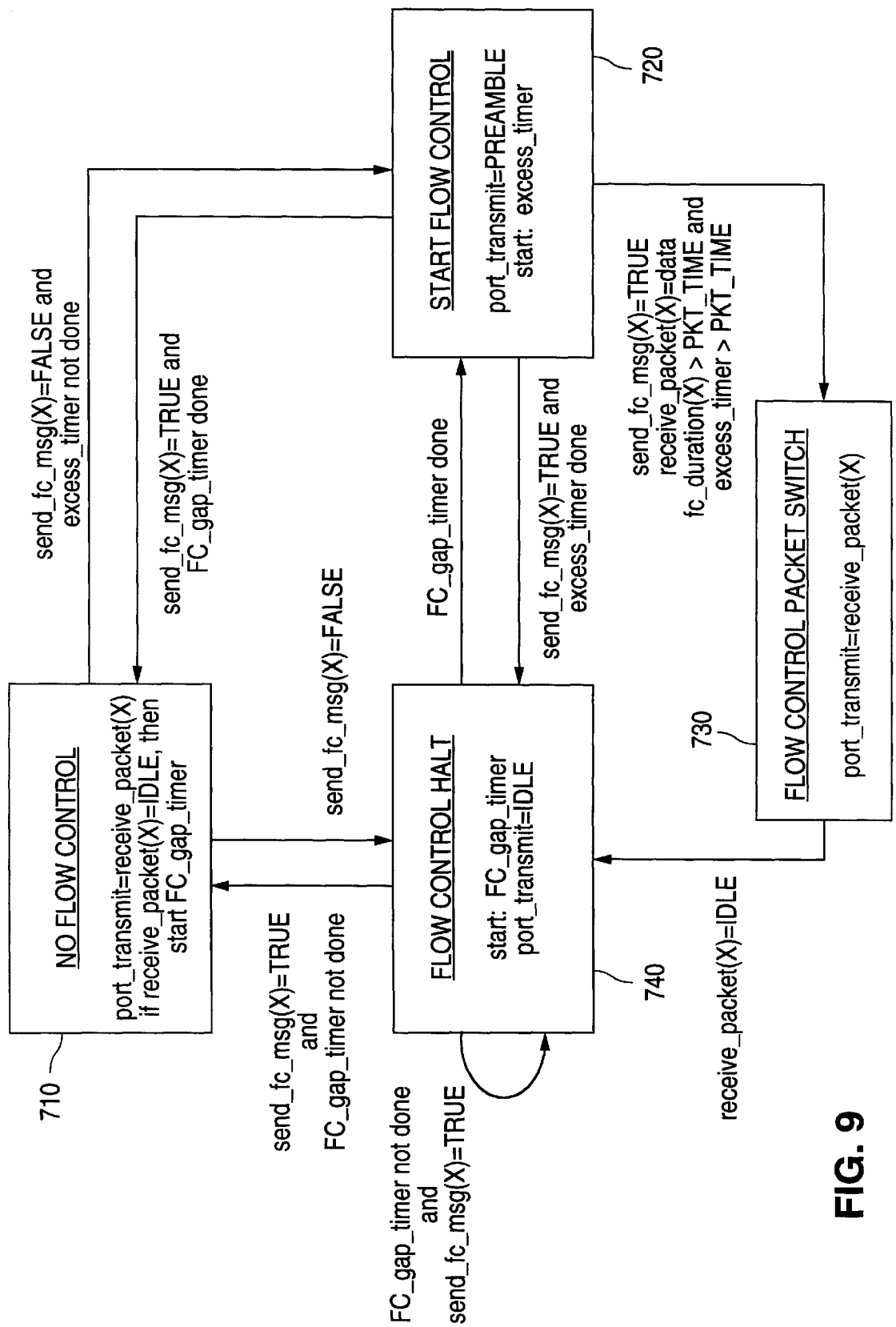
FIG. 9 is a state diagram of a port state machine embodying the present invention.

FIG. 9 is a state diagram illustrating one embodiment of a state machine in FCS 620 implementing the sequence of events just described. Starting with the No Flow Control state 710, if FCS 620 receives receive_packet(X) for Port (X), then it will transmit the packet as port_transmit on Port(X) 630. If there is no packet data for Port(X) (i.e. receive_packet(X)=IDLE), then FCS 620 starts an internal timer FC_gap_timer to ensure a minimal duration of the interframe gap on port(X).

If FCS 620 receives send_fc_msg(X)=TRUE from SRM 610 then FCS 620 will proceed to flow control Port(X) 630. If the fc_gap_timer has expired, then FCS 620 can move to the Start Flow Control state 720 and begin to send out preamble (port_transmit=PREAMBLE) on port(X) 630. When FCS 620 enters Start Flow Control state 720 it sets internal timer excess_timer to a time value which will ensure that the excess time limit of the protocol is not exceeded causing end station 640 on Port(X) 630 to discard any transmission packet it may currently have waiting for transmission.

If FC_gap_timer has not expired when FCS 620 receives send_fc_msg(X)=true while in No Flow Control state 710, then FCS 620 transitions to Flow Control Halt state 740 and waits with port_transmit=IDLE on port(X) 630 so that end station 640 observes a sufficient interframe gap in transmission activity. When FC_gap_timer does expire, FCS 620 transitions to Start FC state 720 to begin transmission of a flow control signal to end station 640.

While FCS 620 is in Start Flow Control state 720, send_fc_msg(X)=true, and the excess_timer expires, then FCS 620 will transition to Flow Control Halt state 740 and start FC_gap_timer. This ensures that end station 640 will observe an interframe gap in the transmission activity without an excessive time violation occurring that will cause end station 640 to discard its transmission packet. The time duration of FC_gap_timer is kept short enough so that FCS 620 causes port(X) 630 to resume transmission before end station 640 will commit to transmitting its data leading to another collision. Thus, when FC_gap_timer expires, FCS 620 transitions back to Start Flow Control state 720.

If receive_packet(X) is received while FCS 620 is flow controlling Port(X) 630, and the remaining duration of the flow control state fc_duration(X) is greater than the time required to transmit receive_packet(X), PKT_TIME, then FCS 620 will transition to state Flow Control Packet Switch 730. In Flow Control Packet Switch 730, FCS 620 will utilize receive_packet(X) as the port_transmit from Port(X) 630 and transmit the packet to end station 640. When transmission of receive_packet(X) completes, FCS 620 transitions to state Flow Control Halt 740 to insert an interframe gap in the transmission activity.

If, during either the Start FC 720 or FC Halt 740 states, FCS 620 receives send_fc_msg(X)=false, then FCS 620 will transition back to the No Flow Control state 710 and transmit receive_packet(X) as it is received in the normal flow of message traffic in network 602.

Figure 10:
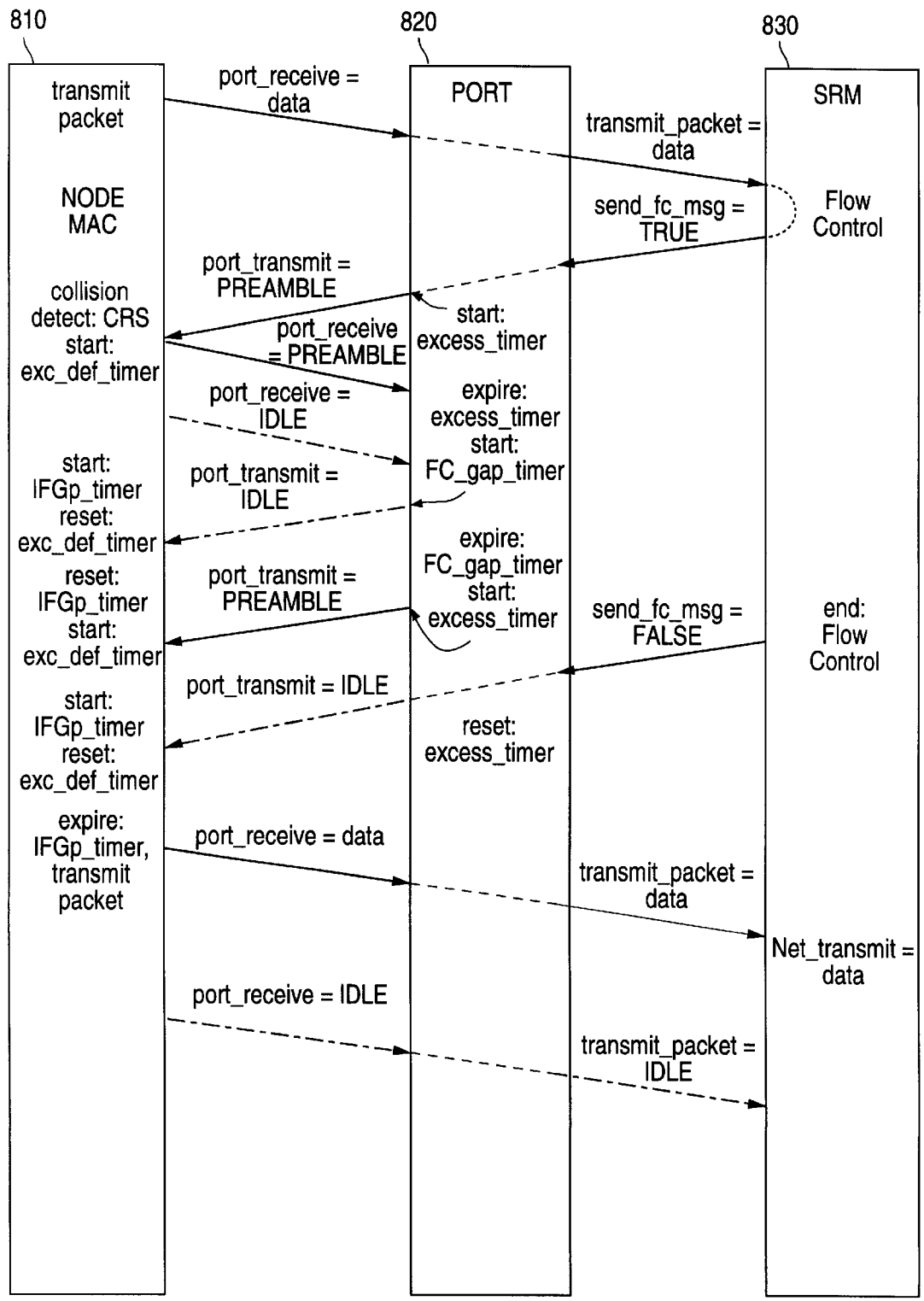
FIG. 10 is a time space diagram illustrating the signaling traffic involved in one scenario involving an embodiment of the present invention.

FIG. 10 is a time space diagram that demonstrates one possible messaging scenario for a port 820 under the control of a flow control signal generator incorporating the flow control state machine of FIG. 9. In the scenario of FIG. 10, node MAC 810 in an end station begins to transmit data to port 820 which passes the data as a transmit_packet to SRM 830. SRM 830 determines that the node MAC 810 should be flow controlled and passes send_fc_msg(X)=TRUE to port 820. Upon receipt of the flow control signal, port 820 starts to transmit a JAM signal, port_transmit_PREAMBLE, to node MAC 810 and starts excess_timer which is set to expire after a time period that is less than the excessive deferral time for the protocol of node MAC 810. Node MAC 810 detects the collision with the PREAMBLE signal and starts transmitting its own PREAMBLE signal for the remainder of a data packet transmission time to ensure, under the protocol, that all other end stations receiving the data packet transmission detect the collision. Node MAC 810 also starts an excessive deferral timer exc_def_timer as part of the communication protocol to monitor the duration of transmission activity from port 820.

As the scenario of FIG. 10 continues, port 820 continues to send PREAMBLE until the excess_timer expires, at which time port 820 halts transmission toward node MAC 810 and starts first deferral timer FC_gap_timer. The break in transmission activity from port 820 causes node MAC 810 to reset exc_def_timer, thereby preventing the MAC from discarding its transmission packet and flagging an excessive deferral error, and starts interframe gap portion timer IFGp_timer which is set to expire after a set portion of an interframe gap under the protocol. In the event that IFGp_timer expires, node MAC 810 will proceed to transmit its data at the end of the interframe gap regardless of whether or not port 820 resumes transmission. However, FC_gap_timer was selected to have a duration less than that of IFGp_timer so as to prevent node MAC 810 from committing to another transmission attempt and, upon the expiration of FC_gap_timer, port 820 resumes transmission of the PREAMBLE signal thereby resetting IFGp_timer in node MAC 810.

When SRM 830 determines that flow control of node MAC 810 should end, send_fc_msg(X) is set to FALSE for port 820. Port 820 then halts transmission toward node MAC 810 and resets excess_timer. The halt in transmission activity from port 820 causes node MAC 810 to reset exc_def timer and to start IFGp_timer. When IFGp_timer expires, node MAC 810 will queue up its transmission data and, at the end of the interframe gap, will again attempt to transmit.

Figure 11:
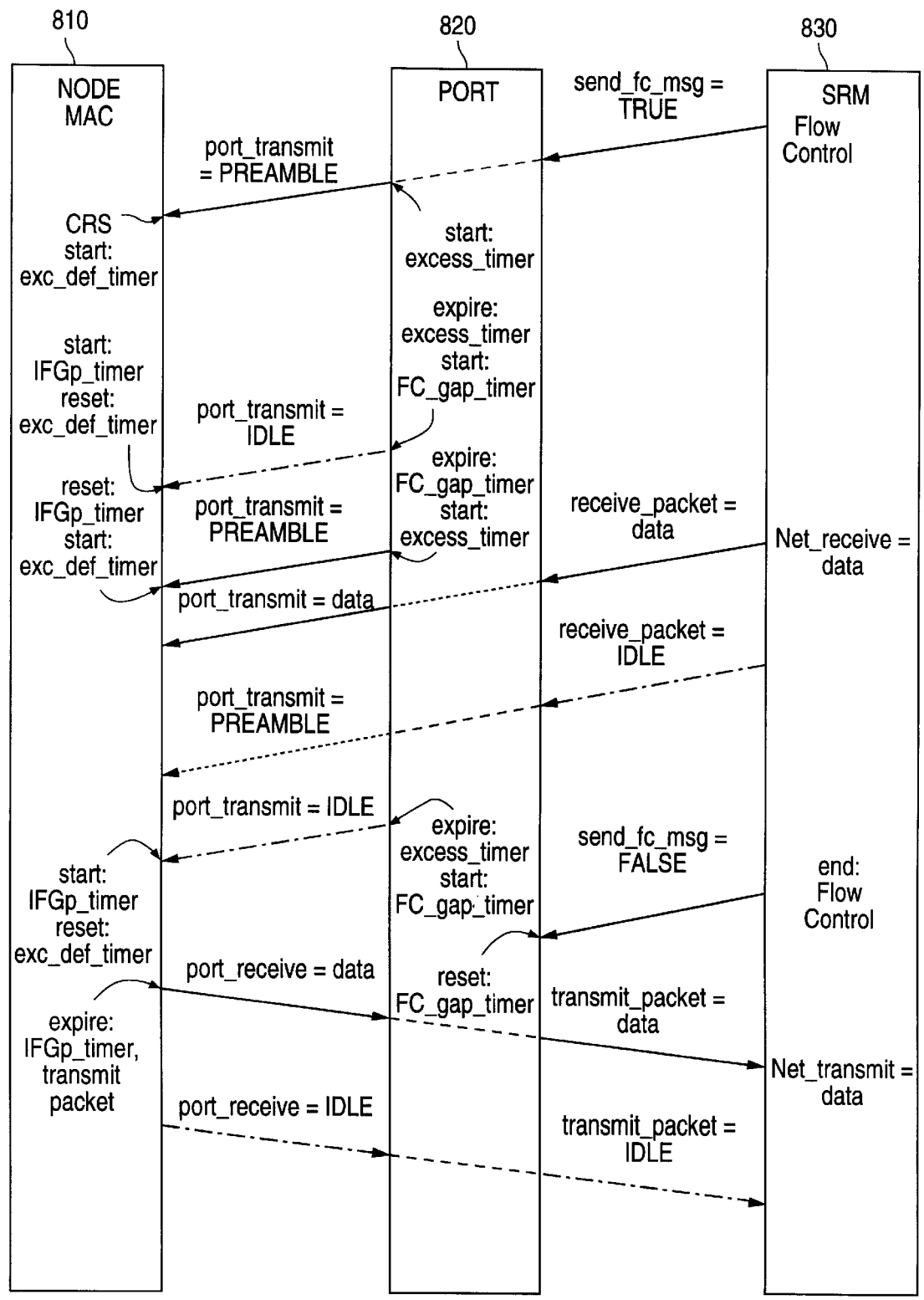
FIG. 11 is a time space diagram illustrating the signaling traffic involved in a second scenario involving an embodiment of the present invention.

FIG. 11 is another time space diagram that demonstrates a second messaging scenario for port 820 under control of a flow control generator incorporating the flow control state machine of FIG. 9. In the scenario of FIG. 11, node MAC 810 is idle when SRM 830 decides to flow control. The send_fc_msg(X)=TRUE signal from SRM 830 prompts port 820 to start transmitting PREAMBLE to node MAC 810 and start excess_timer. The PREAMBLE transmission is detected as carrier activity by node MAC 810 which starts its exc_def_timer. Port 820 halts the PREAMBLE transmission when excess_timer expires at which point it also starts FC_gap_timer. The break in transmission causes node MAC 810 to reset exc_def_timer and start IFGp_timer.

When FC_gap_timer expires, port 820 resumes PREAMBLE transmission and starts excess_timer. The PREAMBLE transmission resets IFGp_timer and starts exc_def_timer in node MAC 810. During the second PREAMBLE transmission, SRM 830 relays a data packet (transmit_packet_data) to port 820 that is addressed to node MAC 810. There is enough time remaining on excess_timer to permit transmission of the data packet, so port 820 will transmit the data packet instead of PREAMBLE to node MAC 810 and port_transmit=data. Port 820 determines that there is still time remaining on excess_timer and resumes PREAMBLE transmission until the timer expires.

When excess_timer expires, port 820 halts the PREAMBLE transmission and starts FC_gap_timer. Node MAC 810 resets exc_def_timer and starts the IFGp_timer in response to the break in transmission. However, during the break in transmission, SRM 830 sends send_fc_msg(X)=FALSE to port 820. Port 820 resets the FC_gap_timer and will not resume PREAMBLE transmission. IFGp_timer in Node MAC 810 is not reset and therefore expires permitting node MAC 810 to attempt transmission of any data received while it was flow controlled.

Figure 12:
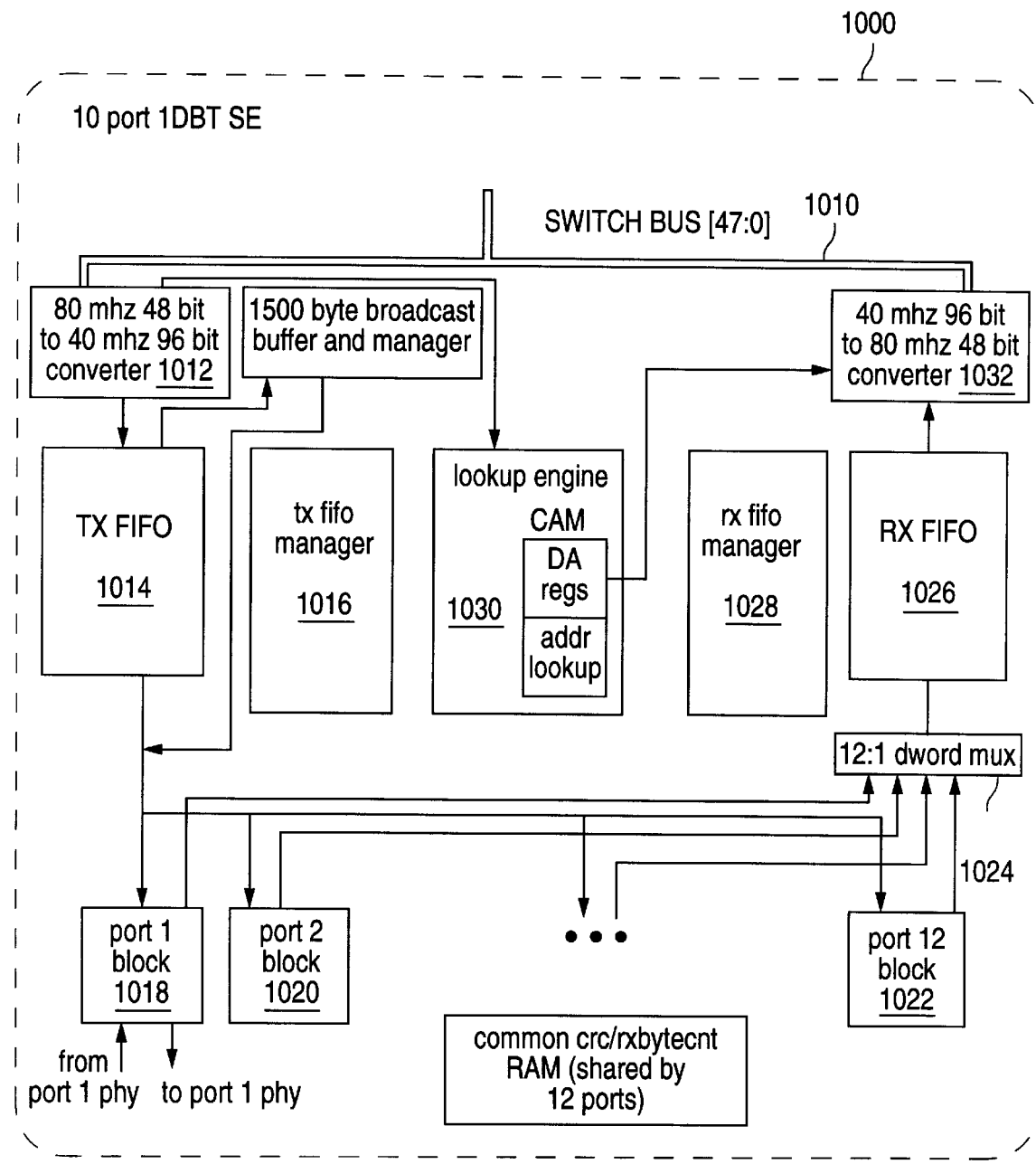
FIG. 12 is a functional block diagram of a switch element embodying the present invention.

FIG. 12 shows a functional block diagram of one specific embodiment of a network switch element utilizing the flow control method of the present invention. The switch element 1000 supports twelve ports which each support communication with a single end station. Switch element 1000 can be connected via switch bus 1010 to other similar switch elements which also support ports servicing end stations.

Data packets received on switch bus 1010 and addressed to ports contained within switch element 1000 are received and converted to the appropriate data size for the ports by converter 1012 which stores the resulting data in a block within TX FIFO 1014 dedicated to the destination port for the packet. TX FIFO manager 1016 manages transmit FIFO blocks stored in TX FIFO 1014 for all the ports in the switch element.

Each port has a port block which is the logical entity corresponding to the physical communication link with each end station. Port 1 block 1018, port 2 block 1020 and port 12 block 1022 are shown in FIG. 12 with the port blocks for ports 3–11 inclusive excluded for the purposes of clarity. Each port block will execute the state machine for that port. For example, port 1 block will act as the flow control signal generator (FCS) 620 including Port(X) 630 illustrated in FIG. 8 and will implement the state diagram illustrated in FIG. 9 for port 1.

Data packets received from a port pass through data MUX 1024 and are stored in the source port's receive FIFO block in RX FIFO 1026. RX FIFO manager 1028 manages the receive FIFO blocks for all the ports in switch element 1000. Data packets in RX FIFO 1026 are converted to the data size for the switch bus by converter 1032 and transmitted onto the switch bus 1010. Even data packets destined for another port on switch element 1000 are transmitted onto switch bus 1010 and received through converter 1012 and stored in TX FIFO 1014.

Lookup engine 1030 examines the source and destination addresses prepended to data packets observed on switch bus 1010 and maintains tables of active ports in a network incorporating multiple switch elements. It is possible to implement the SRM 610 in the lookup engine 1030. By monitoring the active ports in the network and tracking the level of usage of system resources such as the switch bus 1010 bandwidth, the lookup engine 1030 can decide to flow control a port in switch element 1000 in order to prevent the port from transmitting to another port that is already busy transmitting or receiving or to prevent a port from transmitting when the level of message traffic has reached the capacity of switch bus 1010.

Various other modifications and alterations in the structure and method of operation of this invention will be apparent to those having ordinary skill in the art without departing from the scope and spirit of the invention. All such modifications are intended to be encompassed within the following claims. In particular, the invention can be used to support other network media, topologies and protocols than the example ones pictured. Additionally, the invention can be used to simultaneously flow control multiple end stations or entire network segments using a single flow control signal generator broadcasting to multiple end stations connected together in bus topology.

Although the invention has been described in connection with only specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for a central node to flow control one or more end stations in a network comprising the steps:

transmitting a first signal from a central node to an end station such that the first signal causes the end station to defer a data transmission, wherein the end station operates under a medium access control protocol that requires the end station to monitor transmission activity on a communication medium coupled to the end station before transmitting data on the communication medium, and wherein the medium access control protocol requires that the end station wait for a gap in transmission activity on the communication medium that continues for at least a first time period defined by the medium access control protocol;

halting the transmission of the first signal such that a time duration of the transmission of the first signal is less than the first time period of the medium access control protocol, wherein the medium access control protocol requires the end station to wait for at least a second time period before committing to transmitting data onto the communications medium; and resuming transmission of the first signal such that the duration of the period of time during which transmission of the first signal is halted is less than the second time period of the medium access control protocol.

2. The method of claim 1 further comprising the step of terminating flow control of the end station by halting transmission of the first signal.

3. The method of claim 2 wherein the step of transmitting the first signal from a central node further comprises one of:

transmitting a preamble signal that the protocol recognizes as transmission activity that is not data to be received by the end station; and transmitting a valid data packet as defined by the medium access control protocol.

4. The method of claim 3 further comprising the step of waiting for a predetermined minimum period of time before resuming transmission of the first signal.

5. The method of claim 4 wherein the medium access control protocol is the Medium Access Control protocol of IEEE 802.3.

6. A flow control method for a network comprising the steps:

commencing transmission of a flow control signal by a central node onto a communication medium coupled to one or more end stations, wherein a communications subsystem of the end station recognizes the flow control signal as transmission activity;

starting a first timer in the central node when said transmission commences, wherein the first timer is set to expire after a first time period that is less in duration than a first time limit of a communications protocol, wherein the communications protocol requires that the one or more end station monitor transmission activity on the communications medium and refrain from transmitting data so long as a duration of the transmission activity does not exceed the first time limit;

halting transmission of the flow control signal when the first timer expires and starting a second timer, wherein the second timer is set to expire after a second time period that is less in duration than a second time limit of the communications protocol, wherein the communications protocol requires that the one or more end station refrain from transmitting data so long as a duration of a period of transmission inactivity following a period of transmission activity does not exceed the second time limit; and resuming transmission of the flow control signal when the second timer expires.

7. The method of claim 6 further comprising the steps:

terminating flow control of the one or more end station by halting transmission of the flow control signal; and resetting the first and second timers when flow control of the one or more end stations is terminated.

8. The method of claim 7 wherein the step of commencing transmission of the flow control signal further comprises transmitting one of a preamble signal and a data packet defined by the communications protocol.

9. The method of claim 8 wherein the step of halting transmission of the flow control signal flirter includes setting the second timer such that the second time period is at least as great in duration as a predetermined minimum time period.

10. The flow control method of claim 9 wherein the communications protocol is the IEEE 802.3 Medium Access Control.

11. An apparatus including a network element which comprises:

a flow controller configured to control transmission of a data signal to one or more end stations in accordance with a predetermined protocol, wherein the flow controller is further configured to receive a flow control message, wherein the flow controller is further configured to transmit the data signal in response to the flow control message, wherein the flow controller is further configured to halt transmission of the data signal such that the duration of the data signal transmission does not exceed an excessive deferral time defined by the protocol, wherein the flow controller is further configured to resume transmission of the data signal such that the duration of said halting of said data signal transmission is less than a gap time defined by the protocol, and wherein the end stations refrain from transmitting data when transmission of the data signal is halted for less than the gap time.

12. The apparatus of claim 11 further comprising one or more end stations configured to communicate with the flow controller using the predetermined protocol.

13. The apparatus of claim 12 further comprising a communications medium configured to couple the one or more end stations to the flow controller.

14. The network element of claim 11 wherein the first signal comprises one of:

a preamble signal that the protocol recognizes as transmission activity but not as transmission data; and a data signal that includes transmission data that conforms to the predetermined protocol.

15. The network of claim 14 wherein the predetermined protocol is the Medium Access Control protocol of IEEE 802.3.

16. A network comprising:

a first end station configured to couple to and contend for access to a communications medium using a protocol, wherein the protocol requires that said first end station defer transmission of data for up to a first time period when said first end station detects transmission activity on said communications medium, wherein the protocol requires that said first end station wait a second time period after detecting an end to the transmission activity before transmitting data, and wherein the protocol requires said end station to continue to defer transmission of data when said end station detects resumed transmission activity during the second time period; and a center node configured to couple to said communications medium and communicate with said first end station, wherein said center node is farther configured to flow control said first end station by transmitting a first signal to said first end station for a first flow control time period that is less than the first time period of the protocol, wherein said center node is further configured to halt transmission of the first signal for a second flow control time period that is less than the second time period of the protocol, and wherein said center node is further configured to resume transmission of the first signal before the end of the second time period.

17. The network of claim 16 wherein the network further comprises:

a first communications medium coupled between said first end station and said center node.

18. The network of claim 17 wherein the network further comprises:

a second end station configured to couple to another communications medium, wherein said second end station is further configured to contend for access to said another communications medium using the protocol, wherein said center node is further configured to couple to said another communications medium, wherein said center node is further configured to flow control said second end station by transmitting a second signal to said second end station for the first flow control time period that is less than the first time period of the protocol, wherein said center node is further configured to halt transmission of the second signal for the second flow control time period that is less than the second time period of the protocol, and wherein said center node is further configured to resume transmission of the second signal before the end of the second time period.

19. The network of claim 16 further comprising:

a second end station configured to couple to and contend for access to another communications medium using the protocol, wherein said center node is further configured to couple to said another communications medium, wherein said center node is further configured to flow control said second end station by transmitting a second signal to said second end station for the first flow control time period that is less than the first time period of the protocol, wherein said center node is further configured to halt transmission of the second signal for the second flow control time period that is less than the second time period of the protocol, wherein said center node is further configured to resume transmission of the second signal before the end of the second time period, and wherein said center node is further configured to independently flow control each of said first and second end stations.

20. The network of claim 19 further comprising:

first and second communications media, wherein said first communications medium is coupled between said first end station and said center node, and wherein said second communications medium is coupled between said second end station and said center node.

21. The network of claim 16 wherein the first signal comprises one of:

a preamble signal that the protocol recognizes as transmission activity but not as transmission data; and a data signal that includes transmission data that conforms to the protocol.

22. The network of claim 21 wherein the protocol is the Medium Access Control protocol of IEEE 802.3.

* * * * *

UNITED STATES PATENT AND TRADEMARK OFFICE
CERTIFICATE OF CORRECTION

PATENT NO. : 6,198,722 B1
DATED : March 6, 2001
INVENTOR(S) : William Bunch

It is certified that error appears in the above-identified patent and that said Letters Patent is hereby corrected as shown below:

Title page,
Inventor Resident City should be -- San Jose -- not "Sunnyvale";

Column 19,
Line 33, "flirter" should be -- further --;

Column 20,
Line 30, "farther" should be -- further --.

Signed and Sealed this

Sixth Day of November, 2001

Attest:

*Nicholas P. Godici*

Attesting Officer

NICHOLAS P. GODICI
*Acting Director of the United States Patent and Trademark Office*